US011514063B2

(12) United States Patent
Dai et al.

(10) Patent No.: US 11,514,063 B2
(45) Date of Patent: Nov. 29, 2022

(54) METHOD AND APPARATUS OF RECOMMENDING INFORMATION BASED ON FUSED RELATIONSHIP NETWORK, AND DEVICE AND MEDIUM

(71) Applicant: Beijing Baidu Netcom Science Technology Co., Ltd., Beijing (CN)

(72) Inventors: Mingyang Dai, Beijing (CN); Yixuan Shi, Beijing (CN); Zixiang Liu, Beijing (CN); Shengwen Yang, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 33 days.

(21) Appl. No.: 17/207,872

(22) Filed: Mar. 22, 2021

(65) Prior Publication Data

US 2021/0224269 A1  Jul. 22, 2021

(30) Foreign Application Priority Data

Sep. 28, 2020 (CN) .......................... 202011044882.3

(51) Int. Cl.
*G06F 16/2458* (2019.01)
*G06F 21/62* (2013.01)
*G06N 20/00* (2019.01)

(52) U.S. Cl.
CPC .......... *G06F 16/2465* (2019.01); *G06F 21/62* (2013.01); *G06N 20/00* (2019.01)

(58) Field of Classification Search
CPC ............ G06F 16/2465; G06F 16/9535; G06F 21/62; G06F 16/285; G06N 20/00; G06Q 50/01; G06Q 50/30

(Continued)

(56) References Cited

U.S. PATENT DOCUMENTS 8,554,618 B1 * 10/2013 Gasch ................ G06Q 30/0241
705/14.4
9,419,820 B1 * 8/2016 Liang .................... G06Q 50/01
(Continued)

FOREIGN PATENT DOCUMENTS

CN 109286519 A * 1/2019 ........... A61B 5/1118
JP 2012-185812 A 9/2012
(Continued)

OTHER PUBLICATIONS

Official Communication issued in corresponding European Patent Application No. 21164955.3, dated Sep. 29, 2021.
(Continued)

*Primary Examiner* — Ashish Thomas
*Assistant Examiner* — Abdullah A Daud
(74) *Attorney, Agent, or Firm* — Keating & Bennett, LLP

(57) ABSTRACT

The present disclosure provides a method and an apparatus of recommending information based on a fused relationship network. The method includes: determining association relationships between an any node and other nodes in the fused relationship network based on at least one of a weight, interaction information and data source information of the interaction information of an edge; and recommending information to a user represented by the any node based on the association relationships. The present disclosure further provides an apparatus of recommending information based on a fused relationship network, and an electronic device and a storage medium.

10 Claims, 8 Drawing Sheets

(58) Field of Classification Search
USPC .......................................................... 707/776
See application file for complete search history.

(56) References Cited

U.S. PATENT DOCUMENTS

| | | | |
|---|---|---|---|
| 9,552,055 B2 | 1/2017 | Li et al. | |
| 2010/0131489 A1* | 5/2010 | Goldman-Shenhar | ....................... G06F 16/9535 707/E17.108 |
| 2011/0179114 A1* | 7/2011 | Dilip | ................... G06F 16/9535 709/204 |
| 2012/0005216 A1 | 1/2012 | Moritz et al. | |
| 2012/0226651 A1 | 9/2012 | Chidlovskii | |
| 2012/0278310 A1 | 11/2012 | Laksmono et al. | |
| 2013/0031559 A1* | 1/2013 | Alicherry | .............. G06F 9/5077 718/104 |
| 2017/0206276 A1* | 7/2017 | Gill | ....................... G06F 16/285 |
| 2019/0065612 A1* | 2/2019 | Kenthapadi | ............. G06Q 10/10 |
| 2019/0205481 A1 | 7/2019 | Gutnik et al. | |
| 2019/0205999 A1 | 7/2019 | Gutnik et al. | |
| 2020/0058164 A1* | 2/2020 | Sarup | ...................... G06T 19/00 |
| 2020/0320337 A1* | 10/2020 | Yoon | ..................... G06K 9/6271 |
| 2020/0334779 A1* | 10/2020 | Meng | ..................... G06Q 50/01 |
| 2020/0380156 A1* | 12/2020 | Garg | ..................... H04L 9/3239 |
| 2021/0141804 A1* | 5/2021 | Liu | ......................... G06F 16/27 |

FOREIGN PATENT DOCUMENTS

| | | |
|---|---|---|
| JP | 2012-533787 A | 12/2012 |
| JP | 2015-191333 A | 11/2015 |
| JP | 2018-049452 A | 3/2018 |
| RU | 2739473 C1 * 12/2020 | ............. G06F 16/21 |
| WO | 2013/011728 A1 | 1/2013 |

OTHER PUBLICATIONS

Official Communication issued in European Patent Application No. 21 164 955.3-1203, dated Jul. 28, 2022.

Official Communication issued in corresponding Japanese Patent Application No. 2021-056007, dated May 24, 2022.

* cited by examiner

METHOD AND APPARATUS OF RECOMMENDING INFORMATION BASED ON FUSED RELATIONSHIP NETWORK, AND DEVICE AND MEDIUM

CROSS-REFERENCE TO RELATED APPLICATION(S)

This application claims priority to the Chinese patent application No. 202011044882.3, filed on Sep. 28, 2020, which is incorporated herein by reference in its entirety.

TECHNICAL FIELD

The present disclosure relates to a field of data processing technology, in particular to user relationship mining, information dissemination and user recommendation technology, and more specifically, to a method and an apparatus of recommending information based on a fused relationship network, and a device and a medium.

BACKGROUND

With the continuous development of computer and Internet technology, people are more and more used to operating on the Internet, and data mining in the Internet has gradually become a hot spot.

Generally, at present, according to a user's operation data on a network platform, the user's preferences and needs and other related information can be mined, so as to better recommend required information for the user. However, with the rapid increase in the number of users and the increasing complexity of user relationships, it is difficult to meet diverse needs of the user simply by mining the user's operation data, which leads to low efficiency and accuracy of a user recommendation.

SUMMARY

The present disclosure provides a method and an apparatus of recommending information based on a fused relationship network, and a device and a medium.

According to the first aspect, the present disclosure provides a method of recommending information based on a fused relationship network, wherein the fused relationship network includes a plurality of nodes and a plurality of edges connecting the plurality of nodes, wherein each node represents a user, and each edge includes interaction information between users represented by two nodes connected with the edge, data source information of the interaction information, and a weight determined for the edge based on the interaction information and the data source information, the method including: determining association relationships between an any node and other nodes in the fused relationship network based on at least one of the weight, the interaction information and the data source information of the interaction information of the edge; and recommending information to a user represented by the any node based on the association relationships.

According to the second aspect, the present disclosure provides an apparatus of recommending information based on a fused relationship network, wherein the fused relationship network may include a plurality of nodes and a plurality of edges connecting the plurality of nodes, wherein each node represents a user, and each edge may include interaction information between users represented by two nodes connected with the edge, data source information of the interaction information, and a weight determined for the edge based on the interaction information and the data source information. The apparatus may include: a determination module configured to determine association relationships between an any node and other nodes in the fused relationship network based on at least one of a weight, interaction information and data source information of the interaction information of an edge; and a recommendation module configured to recommend information to a user represented by the any node based on association relationships.

According to the third aspect, the present disclosure provides an electronic device, including: at least one processor; and a memory connected in communication with the at least one processor; wherein, the memory stores instructions executable by the at least one processor, and the instructions, when executed by the at least one processor, cause the at least one processor to perform the method of recommending information based on a fused relationship network provided by the present disclosure.

According to the forth aspect, the present disclosure provides a non-transitory computer-readable storage medium having computer instructions stored thereon that, when executed by the computer, cause the computer to perform the method of recommending information based on a fused relationship network provided by the present disclosure.

It should be understood that the content described in this section is not intended to identify the key or important features of the embodiment of the present disclosure, nor is it intended to limit the scope of the present disclosure. Other features of the present disclosure will become easy to understand through the following descriptions.

BRIEF DESCRIPTION OF THE DRAWINGS

The accompanying drawings are used to better understand the scheme of the present disclosure, and do not constitute a limitation to the present disclosure, in which.

DETAILED DESCRIPTION OF EMBODIMENTS

Figure 1:
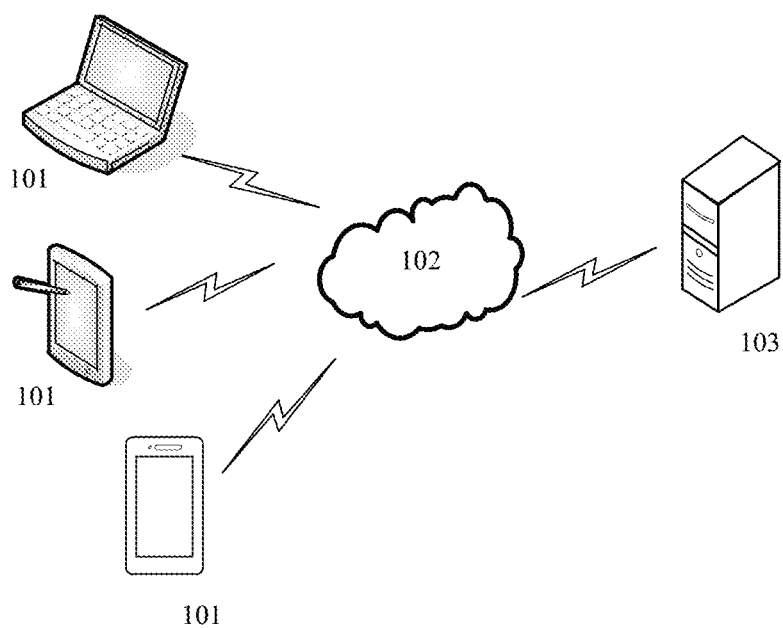
FIG. 1 is an exemplary system architecture to which a method and an apparatus of recommending information based on a fused relationship network may be applied according to an embodiment of the present disclosure.

Exemplary embodiments of the present disclosure are described below in combination with the accompanying drawings, in which various details of the embodiments of the present disclosure are included, to help understanding the present disclosure. The embodiments should be considered as merely exemplary. Therefore, those skilled in the art should recognize that various changes and modifications can be made to the embodiments described herein without departing from the scope and spirit of the present disclosure. Similarly, for the sake of clarity and conciseness, description of well-known functions and structures is omitted in the following description.

With the continuous development of computer and Internet technology, people are more and more used to a way of social intercourse on the Internet. A user's daily interaction operations on various application platforms on the Internet reflect the user's preferences and relationship networks. The user's preferences and relationship networks are widely used in the field of information dissemination, information recommendation and collaborative filtering (CF) recommendation, etc.

In a process of realizing the present disclosure, the inventor finds that a user relationship network can be constructed based on a large amount of interaction data generated on the network platform, and various association information between users of the network platform can be mined based on the relationship network, and targeted recommendations can be made to users having association relationships based on association relationships between users. Compared with traditional user information mined based on user's operation data, the user association relationship mined based on the user relationship network has better pertinence to a user group and can improve the accuracy of a user recommendation.

However, the user relationship network of a single network platform covers a small number of users, and a limited amount of information, and a type of user relationship mined based on the network is single, thus the user recommendation cannot be made efficiently.

In view of this, the embodiment of the present disclosure provides a method and an apparatus of recommending information based on a fused relationship network. The fused relationship network includes a plurality of nodes and a plurality of edges connecting the plurality of nodes. Each node represents a user, and each edge includes interaction information between users represented by two nodes connected with the edge, data source information of the interaction information, and a weight which is determined based on the interaction information and the data source information. The method includes: determining association relationships between an any node and other nodes in the fused relationship network based on at least one of a weight, interaction information, and data source information of the interaction information, of an edge; and recommend information to a user represented by the any node based on the association relationships.

FIG. 1 is an exemplary system architecture 100 to which a method and an apparatus of recommending information based on a fused relationship network may be applied according to an embodiment of the present disclosure. It should be noted that FIG. 1 only shows an example of the system architecture to which the embodiment of the present disclosure may be applied, to help those skilled in the art understand the technical content of the disclosure, but it does not mean that the embodiment of the present disclosure cannot be applied to other devices, systems, environments or scenarios.

As shown in FIG. 1, the system architecture 100 according to the embodiment may include a plurality of terminal equipment 101, a network 102, and a server 103. The network 102 is a medium for providing a communication link between the terminal equipment 101 and the server 103. The network 102 may include various connection types, for example, wired and/or wireless communication links, etc.

Various client applications may be installed on the terminal equipment 101, such as shopping applications, web browser applications, search applications, travel applications, instant messaging tools, email clients and/or social platform software. A user can acquire application services and conduct social networking through these client applications, thus generating a large amount of operation data and interaction data on these application platforms. The operation data may include, for example, the user's search operation data and address data of places visited by the user on an electronic map. The interaction data may include, for example, data generated by the user's interaction operations such as following, sharing, commenting, forwarding, replying, carbon copying, reminding, replying in replies, praising, and grabbing red envelopes on various application platforms.

The terminal equipment 101 may be various electronic devices, including but not limited to smart phones, tablet computers, laptop computers, desktop computers, etc. The server 103 may be an electronic device having certain computing power, which is no limited herein.

The server 103 may acquire the user's operation data and/or interaction data on various application platforms, and construct a user relationship network based on these operation data and/or interaction data from different platforms. Based on the user relationship network, the user's preferences, needs, and the association relationships between users and other information may be mined, and based on the user's preferences, needs, and association relationships and other information, required information may be recommended to the user or the same or similar information may be recommended to a user group having the association relationship, etc.

In an example, based on the places visited by the user on the electronic map, a network of visit trajectory of the user is constructed, and based on the places or category labels of the places searched by the user on the electronic map (such as searching for XX place or XX mall), the user's search information is fused into the network of visit trajectory. The category labels of the places the user preferred may be obtained based on information mining of the network, and the user's needs may be determined based on the category of the places the user preferred, so as to better recommend required information to users.

In another example, due to a small number of users covered by a single social platform and a limited amount of user's interaction information, a user's fused relationship network may be constructed based on user's interaction data from different social platforms. Based on the fused relationship network, a plurality of association relationships between users can be mined. Based on the plurality of association relationships between users, targeted information recommendation can be made to the user group having the association relationship to improve the efficiency of user recommendation.

Figure 2:
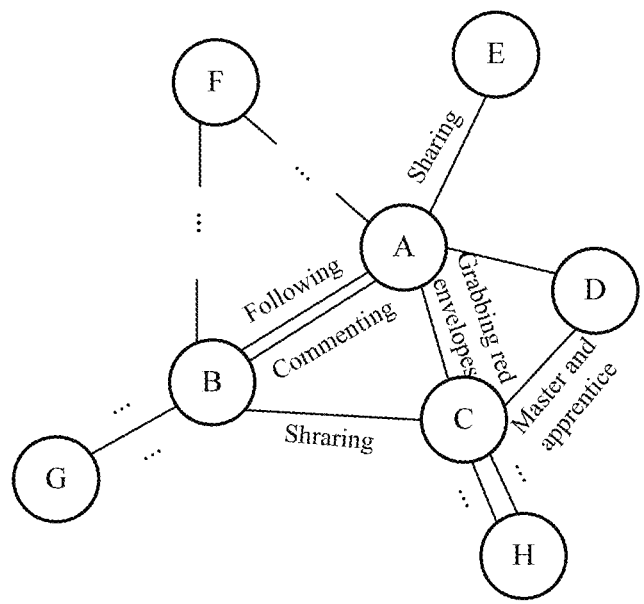
FIG. 2 is a schematic diagram of a fused relationship network according to an embodiment of the present disclosure.

FIG. 2 is a schematic diagram of a fused relationship network according to an embodiment of the present disclosure.

According to the embodiment of the present disclosure, the fused relationship network may include a plurality of nodes and a plurality of edges connecting the plurality of nodes. As shown in FIG. 2, the plurality of nodes may include nodes A to H, as well as other nodes not shown in FIG. 2. Each node may represent a user. For example, node A represents user A, node B represents user B, . . . , Node H represents user H, etc.

According to the embodiment of the present disclosure, the edge between nodes may include interaction information between users of two nodes connected with the edge, data source information of the interaction information, and a weight which is determined based on the interaction information and data source information for the edge. For example, the edge between node A and node B includes interaction information between user A and user B. For example, the interaction information may be user A and user B follow mutually on social networking sites, and user A comments on posts of user B on forum sites, etc. The interaction information may include an interaction type, interaction contents and the data source information of the interaction information. The interaction type may include, for example, at least one of one-way following, two-way following, sharing, commenting, forwarding, replying, carbon copying, reminding, replying in replies, praising, and grabbing red envelopes. The interaction contents may include contents such as texts, pictures, expressions and symbols of comments, and contents such as texts, pictures, expressions and symbols of replies. The data source information of the interaction information may include at least one of at least one application APP, at least one website and at least one address book. For example, the application APP may include a social application APP1, a communication application APP2, a forum application APP3, a network disk application APP4, and a short video application APP5, etc. The website may include various social networking websites, game websites, shopping websites and travel websites, etc. The address book may include a phone number address book, an email friend address book and all kinds of application friend address books.

According to the embodiment of the present disclosure, the weight of the edge between nodes is determined based on the interaction type and the data source information of the interaction information between users represented by the nodes. In an example, different interaction types may be set with different weights. For example, the weight of two-way following may be set to 10, the weight of one-way following may be set to 4, the weight of sharing may be set to 10, the weight of commenting may be set to 2, the weight of forwarding may be set to 10, and the weight of praising may be set to 1, etc. Different data sources may also be set with different weights. For example, the weight of forum application APP3 is 3, the weight of network application APP4 is 5, the weight of social application APP1 is 4, the weight of communication application APP2 is 6, etc. Then, based on the weight of the interaction type and the weight of the data source, a comprehensive weight of the edge may be calculated, and there is a variety of ways to calculate. In an example, a sum of the weight of the interaction type and the weight of the data source may be used as the comprehensive weight of the edge. In another example, the weight of the interaction type and the weight of the data source may be weighted and averaged to obtain a comprehensive weight of the edge, etc. A calculation method of the comprehensive weight is not limited herein.

It should be noted that a plurality of edges may be included between two nodes. For example, user A and user B follow mutually in social application APP1, and user A comments on posts of user B in forum application APP3, thus generating two pieces of interaction information. Then in the fused relationship network, two edges are included between node A and node B, one edge carries the interaction information that user A and user B follow mutually in social application APP1, and the other edge carries the interaction information that user A comments on posts of user B in forum application APP3.

It should be noted that physical relationships between users may also be included in the fused relationship network. For example, information in a mobile phone address book and a mailbox address book in the plurality of data sources may represent offline physical relationships between users. The physical relationships between a user and other users may be determined according to identity information of other users that the user remarks in the address book. For example, user C remarks user D as "teacher XX" in the mobile phone address book, and a master-apprentice relationship between user C and user D may be determined.

According to the embodiment of the present disclosure, the fused relationship network includes interaction information from different data sources and different interaction types. Compared with the traditional user relationship network, the information coverage is wide and the number of users involved is large, which can provide strong support for subsequent user relationship mining and user personality recommendation.

Figure 3:
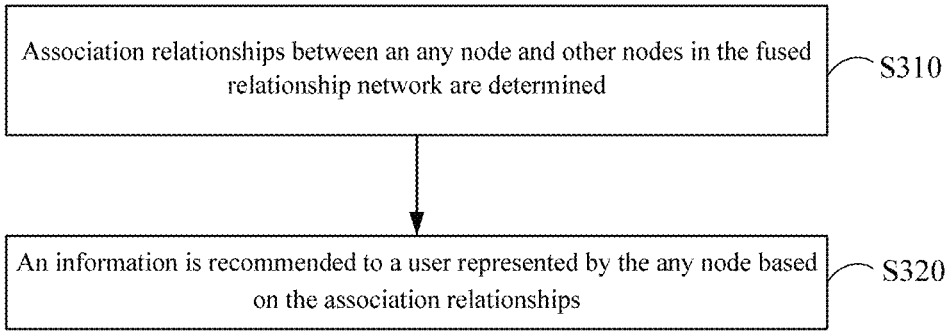
FIG. 3 is a flow chart of a method of recommending information based on a fused relationship network according to an embodiment of the present disclosure.

FIG. 3 is a flow chart of an method of recommending information based on a fused relationship network according to an embodiment of the present disclosure.

As shown in FIG. 3, the method 300 of recommending information based on the fused relationship network may include operations S310 to S320.

In operation S310, based on at least one of a weight, interaction information and data source information of the interaction information, of an edge, association relationships between an any node and other nodes in the fused relationship network are determined.

According to the embodiment of the present disclosure, for an any node in the fused relationship network, the association relationships between the any node and other nodes may be determined based on at least one of the weight, the interaction information and the data source information of the edge connected with the any node, among which there may be many kinds of association relationships.

For example, the weight of the edge between nodes may represent closeness of the relationship between nodes. For above node A, other nodes may be sorted based on the weight of the edges between node A and other nodes. For example, the weight of the edge between node A and node B is 10, the weight of the edge between node A and node C is 8, the weight of the edge between node A and node D is 20, and the weight of the edge between node A and node E is 5, then node B to node E may be sorted according to an order of weight from large to small, and a sorting order of node D, node B, node C and node E may be obtained. The sorting order gives an order of the closeness between node A and other nodes (node B to node E).

For example, the interaction information included by the edge between nodes may represent the user's interests and needs. Semantic analysis may be carried out for the interaction information to extract a user's interest fields (such as skiing and travelling) and needs (such as skiing tutorials and tourism strategies) regarding the node. User groups in the same interest field have the same or similar interests.

For example, the data source information of the interaction information carried by the edge between nodes may represent a source of the interaction information between users. By dividing the nodes according to the data source, the nodes in the fused relationship network may be divided into a plurality of node groups regarding the data source, and the interaction information between users of nodes in each node group has the same data source relationship. For example, the interaction information between users of each node in one node group comes from the communication application APP2, and the interaction information between users of each node in another node group comes from the forum application APP3.

In operation S320, information is recommended to a user represented by the any node based on the association relationships.

According to the embodiment of the present disclosure, targeted recommendation may be made to users represented by the nodes in the fused relationship network based on the association relationships between users mined.

For example, based on closeness relationships between node A and other nodes, the users represented by a certain number of nodes ranking ahead in a closeness order may be selected as associated users of the user of node A, and information concerned by the associated users may be pushed to the user of node A.

For example, information of the same or similar needs (such as skiing tutorial and tourism strategy) may be recommended to user groups having the same interest field (such as skiing and travelling).

For example, different information may be sent to user groups represented by node groups of different data sources in the fused relationship network. For example, entertainment, TV play and other information are sent to the user group of social application APP1, and short messages such as weather warning are sent to the user group of an address book.

According to the embodiment of the present disclosure, the user recommendation may also be made in combination with a plurality of association relationships. For example, the information concerned by the associated users of the user of node A may be recommended to the user of node A based on the closeness relationships first, and then the information related to the interest field may be recommended to the user of node A based on the node groups regarding interest field node A is located.

It will be understood by those skilled in the art that according to the embodiment of the present disclosure, association relationships between an any node and other nodes in the fused relationship network are determined based on at least one of a weight, interaction information and data source information of the interaction information, of an edge in the fused relationship network, and the information is recommended to the user of the any node based on the association relationships. Compared with the traditional relationship network based on a single data source, the fused relationship network has a wide coverage of data sources and a full amount of user relationship information, which can mine a plurality of association relationships between users. Compared with the traditional user recommendation according to user information mined based on the user's operation data, the information recommendation made to the users having association relationships based on the association relationships between users has better pertinence to user groups, and can improve the efficiency and accuracy of user recommendation.

Figure 4:
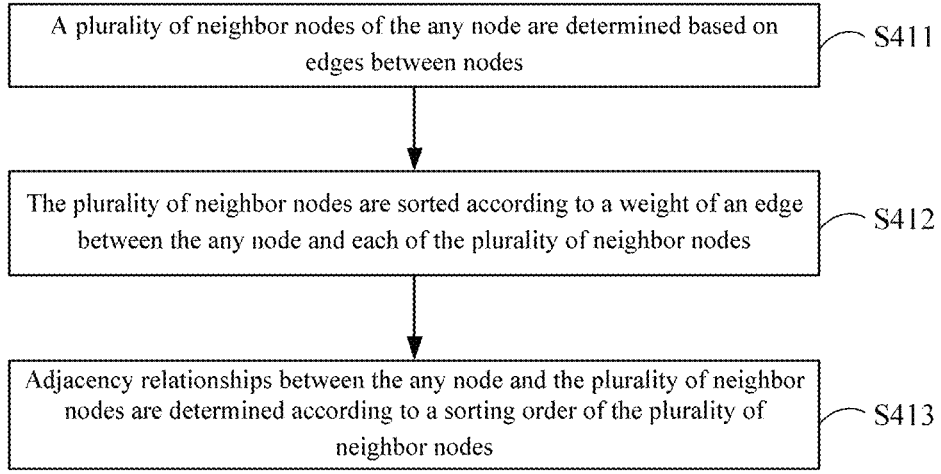
FIG. 4 is a flow chart of a method for determining association relationships between an any node and other nodes in the fused relationship network according to an embodiment of the present disclosure.

FIG. 4 is a flow chart of a method for determining the association relationships between an any node and other nodes in the fused relationship network according to an embodiment of the present disclosure.

As shown in FIG. 4, the method for determining association relationships between an any node and other nodes in the fused relationship network may include operations S411 to S413.

In operation S411, a plurality of neighbor nodes of the any node are determined based on edges between nodes.

According to the embodiment of the present disclosure, the neighbor nodes of any current node may include a first-level neighbor node, a second-level neighbor node, and a multi-level neighbor node, etc. The first-level neighbor node is the node directly connected with any current node, the second-level neighbor node is the node indirectly connected with any current node spanning one node, and the multi-level neighbor node is the node indirectly connected with any current node spanning a plurality of nodes. For example, the first-level neighbor nodes of above node A include node B to node E, the second-level neighbor nodes of above node A include node G and node H, and the multi-level nodes of above node A include node F.

In operation S412, the plurality of neighbor nodes are sorted according to a weight of an edge between the any node and each of the plurality of neighbor nodes.

According to the embodiment of the present disclosure, the first-level neighbor node is the node most closely connected with the current node, and the user represented by the first-level neighbor node may be used as the associated user of the user of node A preferably. For example, a plurality of first-level neighbor nodes of node A may be sorted according to an order of weights of the edges connected with node A from large to small.

According to the embodiment of the present disclosure, the node A and the second-level neighbor node are indirectly connected spanning one first-level neighbor node, and a weighted average value between the weight between node A and the first-level neighbor node and the weight between the first-level neighbor node and the second-level neighbor node may be used as a weight between node A and the second-level neighbor node. For example, node A and node G are indirectly connected spanning node B, then a weight between node A and node G is a weighted average between a weight between node A and node B and a weight between node B and node G.

According to the embodiment of the present disclosure, the user represented by the second-level neighbor node of node A may be used as a supplementary associated user of the user of node A. For example, a plurality of second-level neighbor nodes of node A may be sorted according to an order of weights between node A and second-level neighbor nodes from large to small.

In operation S413, adjacency relationships between the any node and the plurality of neighbor nodes are determined according to a sorting order of the plurality of neighbor nodes.

According to the embodiment of the present disclosure, a sorting order of the first-level neighbor nodes represents the adjacency relationships between node A and the plurality of first-level neighbor nodes, and a sorting order of second-level neighbor nodes represents the adjacency relationships between node A and the plurality of second-level neighbor nodes. For example, when recommending information to the user of node A, the information concerned by the users of the first-level neighbor nodes of node A may be used for recommendation. Further, if the number of first-level neighbor nodes does not meet the requirements, the information concerned by the users of the second-level neighbor nodes may be used for recommendation. According to actual needs, the information concerned by users of third-level nodes and multi-level nodes may also be used for recommendation, which will not be repeated here.

Figure 5:
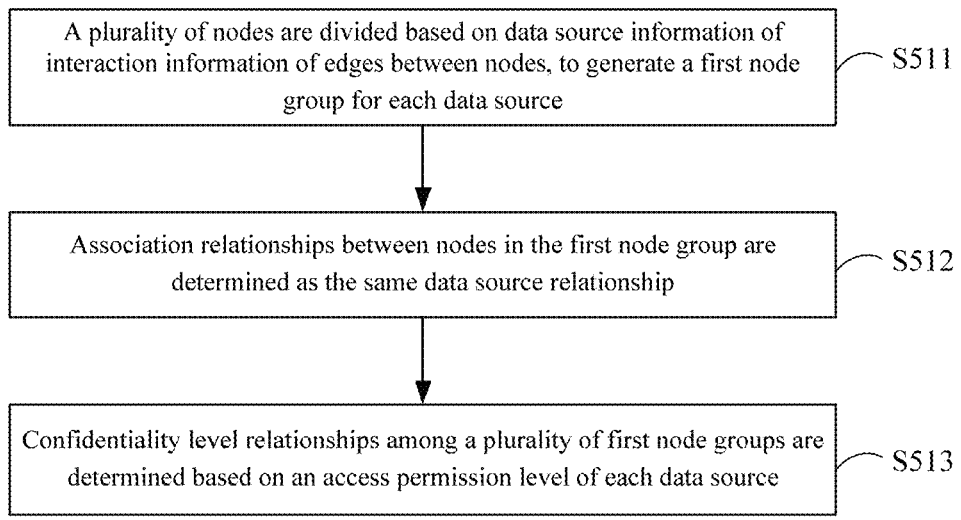
FIG. 5 is a flow chart of a method for determining association relationships between an any node and other nodes in a fused relationship network according to another embodiment of the present disclosure.

FIG. 5 is a flow chart of a method for determining association relationships between an any node and other nodes in the fused relationship network according to another embodiment of the present disclosure.

As shown in FIG. 5, the method for determining association relationships between an any node and other nodes in the fused relationship network may include operations S511 to S513.

In operation S511, a plurality of nodes are divided based on data source information of interaction information of edges between nodes, to generate a first node group for each data source.

In operation S512, association relationships between nodes in the first node group are determined as the same data source relationship.

According to the embodiment of the present disclosure, the data source may include APPs such as a social application APP1, a communication application APP2, a forum application APP3, a network disk application APP4 and a short video application APP5, and may also include various social networking websites, game websites, shopping websites and travel websites, and may also include a phone number address book, an email friend address book and other friend address books of various applications, etc. By dividing the nodes according to the data source, the nodes in the fused relationship network may be divided into a plurality of node groups, and a user group of each node group has the same data source relationship. For example, the interaction information between the users of one node group comes from the communication application APP2, and the interaction information between the users of another node group comes from the forum application APP3, etc.

According to the embodiment of the present disclosure, different information may be sent to user groups represented by node groups of different data sources in the fused relationship network. For example, entertainment, TV play and other information are sent to a user group of social application APP1, and short messages such as weather warning are sent to a user group of an address book.

In operation S513, confidentiality level relationships among a plurality of first node groups are determined based on an access permission level of each data source.

In an example, different data sources have different access levels. For example, the access permission level of an address book is the highest, and the access permission level of social application APP1 and communication application APP2 is lower. Based on the access permission level of different data sources, the confidentiality level of the node group for the data source may be set. For example, the node group for the address book has the highest confidentiality level, the node group for the communication application APP2 has the second highest confidentiality level, and the node group for the social application APP1 has the lowest confidentiality level. Some information may be only recommended to the users of the node group having the highest confidentiality level. Some other information may be only recommended to the users of the node group having the lowest confidentiality level.

Figure 6:
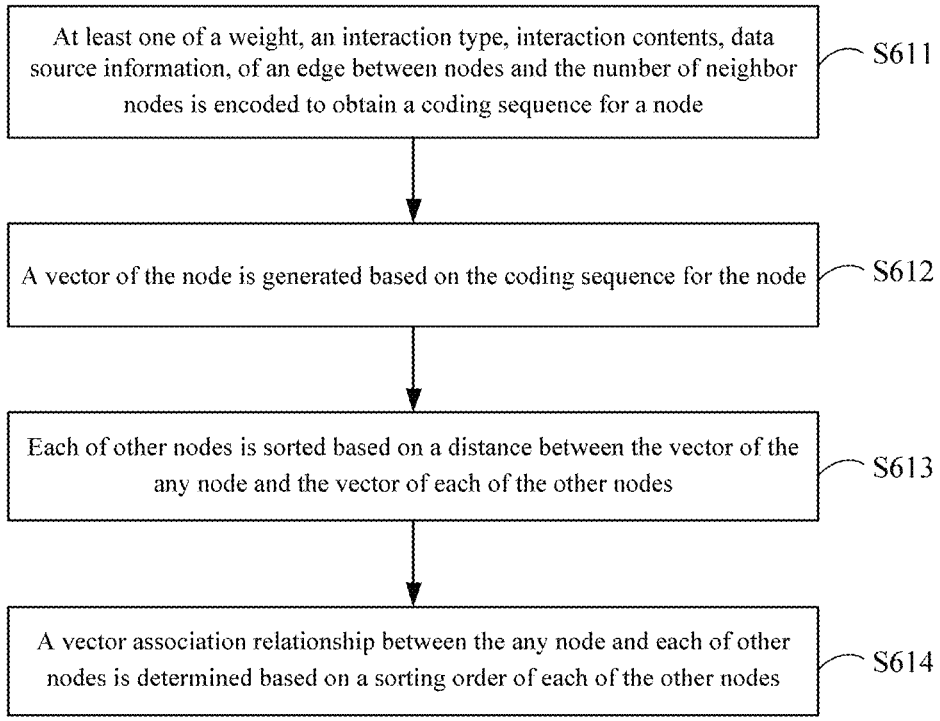
FIG. 6 is a flow chart of a method for determining association relationships between an any node and other nodes in a fused relationship network according to another embodiment of the present disclosure.

FIG. 6 is a flow chart of a method for determining association relationships between an any node and other nodes in the fused relationship network according to another embodiment of the present disclosure.

As shown in FIG. 6, the method for determining association relationships between an any node and other nodes in the fused relationship network may include operations S611 to S614.

In operation S611, at least one of a weight, an interaction type, interaction contents, data source information, of an edge between nodes and the number of neighbor nodes is encoded to obtain a coding sequence for a node.

According to the embodiment of the present disclosure, the weight, the interaction type of the interaction information, the interaction contents, the data source, of an edge between nodes and the number of neighbor nodes may be taken as attribute information of a node, and these information may be encoded to represent the attribute of the node in the form of coding. In addition, other attribute information of the user of the node may also be encoded, such as a gender, an age and a profile.

In operation S612, a vector of the node is generated based on the coding sequence for the node.

According to the embodiment of the present disclosure, the coding sequence may be converted into a vector. For example, a graph neural network (GNN) may be used for learning of a vector representation. A topology graph of a fused relationship network is input into the graph neural network, herein, the attribute of each node in the topology graph of the fused relationship network includes above attribute information in coding form. The graph neural network includes a graph embedding processing layer, which transforms the attribute information of the node into a vector and outputs, to obtain the vector of the node. Parameters of the graph neural network may be adjusted based on an output result of the graph neural network (for example, the graph neural network is used for classification, and the output result of the graph neural network is a classification result). During a training process, the output result is continuously optimized, while the vector output by the graph embedding processing layer is also optimized, so as to obtain the vector representation of the node having higher accuracy.

In operation S613, each of other nodes is sorted based on a distance between the vector of the any node and the vector of each of the other nodes.

In an example, vectors of all nodes in the topology graph of the fused relationship network constitute a vector space. An approximate nearest neighbor (ANN) may be used to process the vector of any node A in the vector space to obtain the vectors of the first K nodes having closest distance to the vector of any node A.

In operation S614, a vector association relationship between the any node and each of other nodes is determined based on a sorting order of each of the other nodes.

According to the embodiment of the present disclosure, the sorting order of the first K nodes represents the vector association relationships between the any node A and the first K nodes. When recommending information to the user of node A, information concerned by the users of the first K nodes may be used for recommendation.

Figure 7:
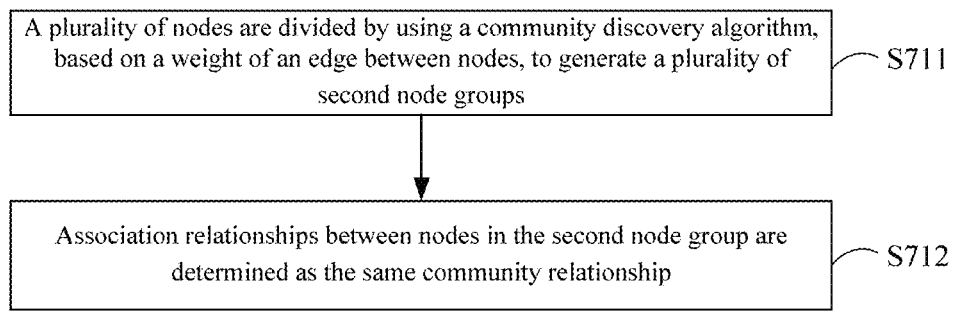
FIG. 7 is a flow chart of a method for determining association relationships between an any node and other nodes in a fused relationship network according to another embodiment of the present disclosure.

FIG. 7 is a flow chart of a method for determining association relationships between an any node and other nodes in the fused relationship network according to another embodiment of the present disclosure.

As shown in FIG. 7, the method for determining association relationships between an any node and other nodes in the fused relationship network may include operations S711 to S712.

In operation S711, a plurality of nodes are divided by using a community discovery algorithm, based on a weight of an edge between nodes, to generate a plurality of second node groups.

In operation S712, association relationships between nodes in the second node group are determined as the same community relationship.

According to the embodiment of the present disclosure, the nodes in the fused relationship network may be divided into a plurality of communities by using the community discovery algorithm based on the topology graph of the fused relationships network. For example, the community discovery algorithm may include a label propagation algorithm and Louvain algorithm. Both label propagation algorithm and Louvain algorithm are graph-based processing algorithms, which can process the plurality of nodes based on a weight of an edge between nodes in the topology graph to obtain a plurality of communities by dividing.

In an example, a process of a community division using the label propagation algorithm may be to specify an own label for each node in the topology graph of the fused relationship network, which may be, for example, an identification of the user of each node. Each node passes its own label to the neighbor node whose weight of the edge regarding the node is larger than a preset threshold. Each neighbor node receives the label passed by the node, updates its own label, and continues to pass according to above rules until labels of all nodes no longer change. For example, the neighbor nodes of node A include node B to node E. Among which, node A's label is A, node B's label is B, . . . , and node E's label is E. The weight of the edge between node A and node B, node C and node E is larger than 2, and the weight of the edge between node A and node D is smaller than 2. Then node A passes its label A to node B, node C and node E, and node B, node C and node E update their own labels. Node B's label is updated to A and B, node C's label is updated to A and C, and node E's label is updated to A and E. Then node B carries out the next round of label passing, and passes its own labels A and B to the neighbor nodes whose weight of the edge regarding node B is larger than 2. The labels of all nodes are updated round by round until the labels of all nodes no longer change. The nodes having the same label, or the nodes having the same label more than a certain proportion, are divided into the same community. All nodes in the topology graph are traversed to perform above steps until the labels of all nodes no longer change, and the communities divided based on the labels also no longer change.

In an example, a process of community division using Louvain algorithm may be as follows: at the beginning, each node in the topology graph of the fused relationship network is taken as a community, and each node and its neighbor node are merged together as a community in turn. Then a modularity gain of the community after merged and the community (node itself) before merged is calculated, and the node is allocated to the community whose modularity gain is larger than 0 and whose modularity gain is the largest. Herein, the modularity gain is a differential value that a sum of weights of all edges in a divided community minus a sum of weights of the edges connected with all nodes in the community. Above steps are performed repeatedly until the communities to which all nodes belong no longer change. For example, the neighbor nodes of node A include node B to node E, and node A is divided to node B to node E in turn to form the communities including node A and node B, node A and node C, node A and node D, and node A and node E. The modularity gain of the community including node A and node B is calculated as a differential value that a weight of the edge between node A and node B minus a sum of weights between node A and node C, node A and node E, and node B and node G. The modularity gain of the community including node A and node C is a differential value that a weight of the edge between node A and node C minus a sum of weights between node A and node B, node A and node E, and node C and node H. Methods for calculating the modularity gains of the community including node A and node D and the community including node A and node E are the same as above. If the modularity of the community including node A and node B is the largest and larger than 0, node A and node B are divided into a community. Then, above steps may be performed repeatedly for other nodes. For example, for node C, node C may be divided to node A and node B to form a community in turn, and node C may be divided to node D to form a community, etc., to obtain a plurality of new communities. The modularity of each new community is calculated in turn, and then the community to which node C belongs is determined. All nodes in the topology graph are traversed to perform above steps until the communities to which all nodes belong no longer change.

According to the embodiment of the present disclosure, users of nodes in the same community have association relationships regarding the same social circle, therefore, advertising or Feed recommendation can be carried out for the community designated.

Figure 8:
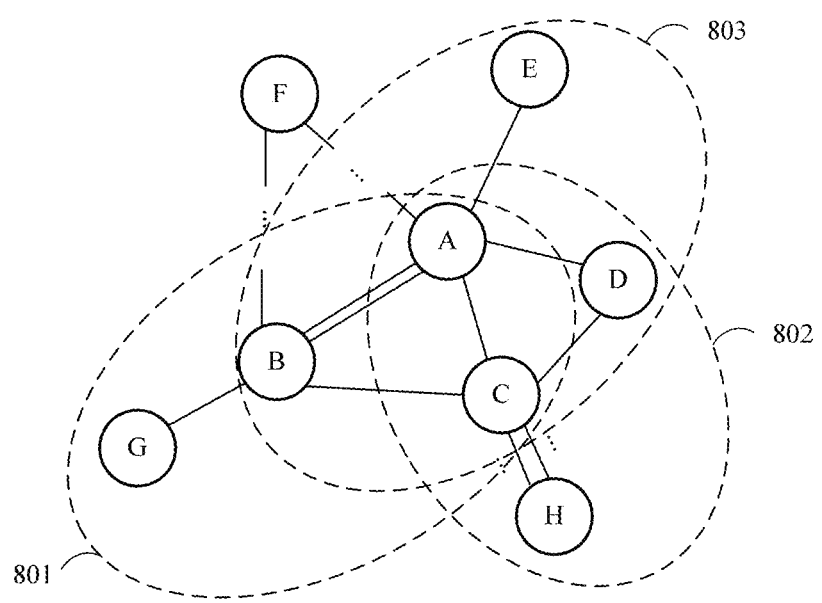
FIG. 8 is a schematic diagram of a community division according to an embodiment of the present disclosure.

FIG. 8 is a schematic diagram of a community division according to an embodiment of the present disclosure.

As shown in FIG. 8, the nodes in the fused relationship network are divided into a plurality of communities by using the community discovery algorithm, and community 801, community 802 and community 803 may be obtained. Among which, community 801 includes node A, node B, node C and node G, community 802 includes node A, node C, node D and node H, and community 803 includes node A, node B, node C, node D, and node E. It should be noted that the same node may be divided into different communities. For example, node A belongs to community 801, community 802 and community 803, node B belongs to community 801 and community 803, and node C belongs to community 802 and community 803.

Figure 9:
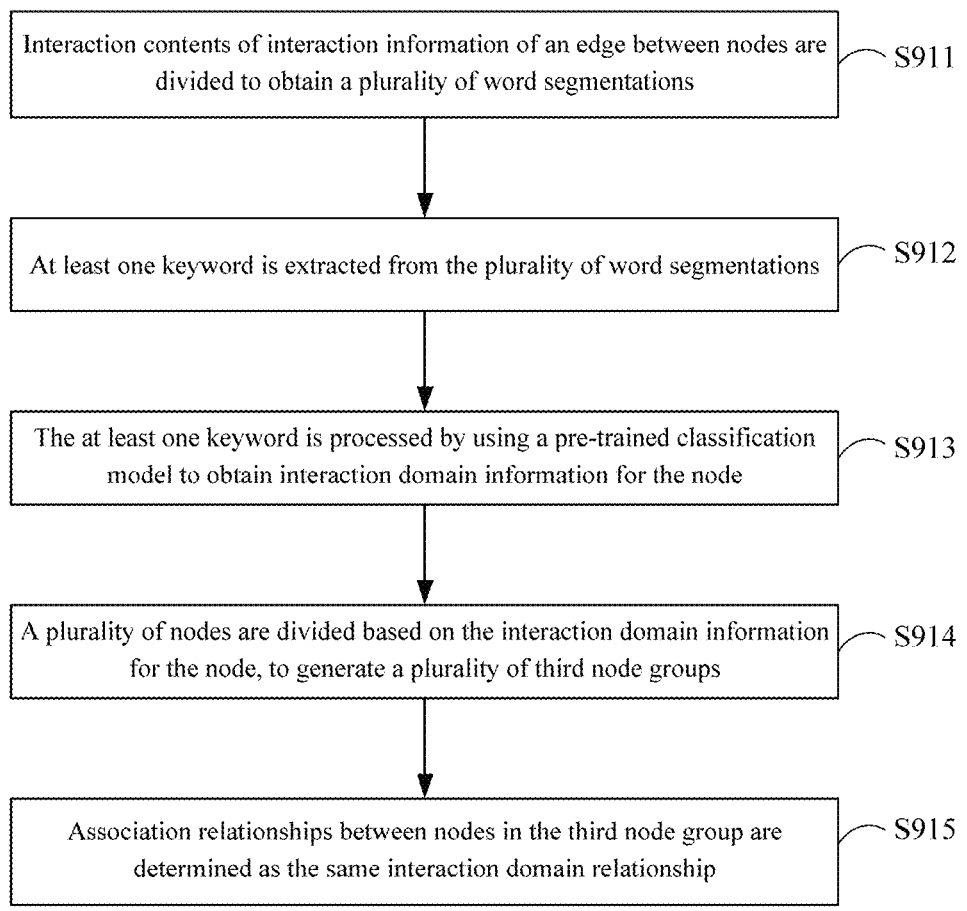
FIG. 9 is a flow chart of a method for determining association relationships between an any node and other nodes in a fused relationship network according to another embodiment of the present disclosure.

FIG. 9 is a flow chart of a method for determining association relationships between an any node and other nodes in the fused relationship network according to another embodiment of the present disclosure.

As shown in FIG. 9, the method for determining association relationships between an any node and other nodes in the fused relationship network may include operations S911 to S915.

In operation S911, interaction contents of interaction information of an edge between nodes are divided to obtain a plurality of word segmentations.

According to the embodiment of the present disclosure, the interaction information of an edge between nodes may include texts, pictures, symbols and expressions of comments, etc., and texts, pictures, symbols and expressions of replies, etc. The text may be divided, for example, nouns and verbs, etc. in the text may be divided to obtain a plurality of word segmentations.

In operation S912, at least one keyword is extracted from the plurality of word segmentations.

In an example, a noun may be extracted from the word segmentations as the keyword.

In operation S913, the at least one keyword is processed by using a pre-trained classification model to obtain interaction domain information for the node.

According to the embodiment of the present disclosure, the pre-trained classification model may be obtained by training using a large number of text and a pre-constructed classification system. Herein, the text may be a word segmentation dictionary obtained by dividing a large number of text interaction contents, and the classification system may be constructed according to certain domain classification rules. For example, the classification system may include sports, tourism, medical treatment, and science and technology, etc. Among which, the sports include football, basketball, swimming, and skiing, etc. An input of the classification model may be a word segmentation in the dictionary, and an output may be a domain category corresponding to the word segmentation. For example, a word segmentation (such as ski goggles) of text content in the interaction information of a node is input into the classification model, and the interaction domain information (such as skiing) for the node may be output.

In operation S914, a plurality of nodes are divided based on the interaction domain information for the node, to generate a plurality of third node groups.

In operation S915, association relationships between nodes in the third node group are determined as the same interaction domain relationship.

According to the embodiment of the present disclosure, the nodes in the fused relationship network may be divided based on the interaction domain information for each node to obtain a plurality of node groups for the interaction domain. Users of nodes in each node group have an association relationship of the same interaction domain. For example, the interaction domain for the nodes in a node group is skiing, then the users of the nodes in the node group have an association relationship of the skiing domain, and ski related advertising or Feed recommendation may be made to the users of this node group.

Figure 10:
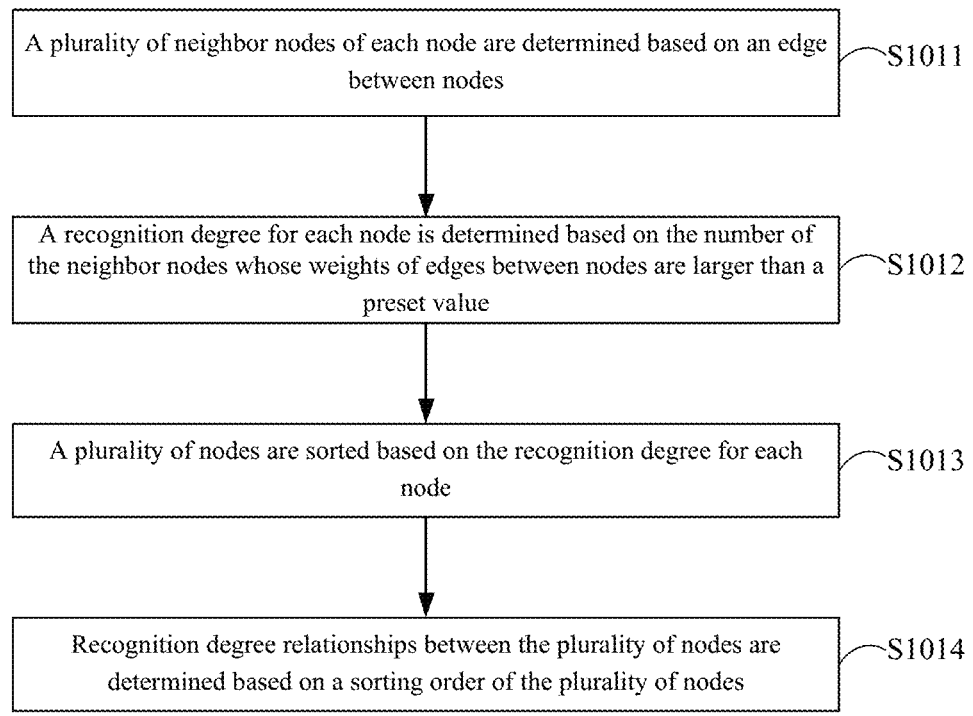
FIG. 10 is a flow chart of a method for determining association relationships between an any node and other nodes in a fused relationship network according to another embodiment of the present disclosure.

FIG. 10 is a flow chart of a method for determining association relationships between an any node and other nodes in the fused relationship network according to another embodiment of the present disclosure.

As shown in FIG. 10, the method for determining association relationships between an any node and other nodes in the fused relationship network may include operations S1011 to S1014.

In operation S1011, a plurality of neighbor nodes of each node are determined based on an edge between nodes.

According to the embodiment of the present disclosure, the neighbor nodes of any current node may include a first-level neighbor node, a second-level neighbor node, and a multi-level neighbor node, etc. The first-level neighbor node is the node directly connected with any current node, the second-level neighbor node is the node indirectly connected with any current node spanning one node, and the multi-level neighbor node is the node indirectly connected with any current node spanning a plurality of nodes. For example, the first-level neighbor nodes of node A include node B to node E, the second-level neighbor nodes of node A include node G and node H, and the multi-level nodes of node A include node F.

In operation S1012, a recognition degree for each node is determined based on the number of the neighbor nodes whose weights of edges between nodes are larger than a preset value.

According to the embodiment of the present disclosure, node A and the second-level neighbor node are indirectly connected spanning one first-level neighbor node, and a sum of the weight between node A and the first-level neighbor node and the weight between the first-level neighbor node and the second-level neighbor node may be used as a weight between node A and the second-level neighbor node. For example, node A and node G are indirectly connected spanning node B, then a weight between node A and node G equals a weight between node A and node B plus a weight between node B and node G.

According to the embodiment of the present disclosure, the more neighbor nodes any current node has, the more associated users the user representing by the node has, and the larger the weight of the edge between the any current node and its neighbor node is, the higher the importance of this node is. Therefore, the recognition degree for the node may be measured based on a sum of all neighbor nodes whose weights of edges regarding the node are larger than a certain value among neighbor nodes of different levels. The recognition degree may be calculated through Page Rank algorithm and other centrality algorithms, and may also be calculated by weighting calculating results of various centrality algorithms. For example, the number of the first-level neighbor nodes of node A is 10, among which, the number of the first-level neighbor nodes whose weights of edges regarding node A larger than 10 is 8. The number of the second-level neighbor nodes of node A is 40, and the number of the second-level neighbor nodes whose weights of edges regarding node A larger than 10 is 30, etc. The recognition degree for node A equals 8 plus 30 plus the number of multi-level neighbor nodes whose weights larger than 10. The higher the recognition degree for node A is, the more likely the node is to exhibit a collective effect in the fused relationship network.

In operation S1013, a plurality of nodes are sorted based on the recognition degree for each node.

In operation S1014, recognition degree relationships between the plurality of nodes are determined based on a sorting order of the plurality of nodes.

According to the embodiment of the present disclosure, the recognition degree is calculated for each node, and the nodes are sorted according to an order of recognition degree from large to small. The users of nodes with high recognition degree have higher influence than those of nodes with low recognition degree. A user recommendation may be made to the user of node with high recognition degree when making the user recommendation, so that the user can influence users of other nodes to obtain a better recommendation effect.

Figure 11:
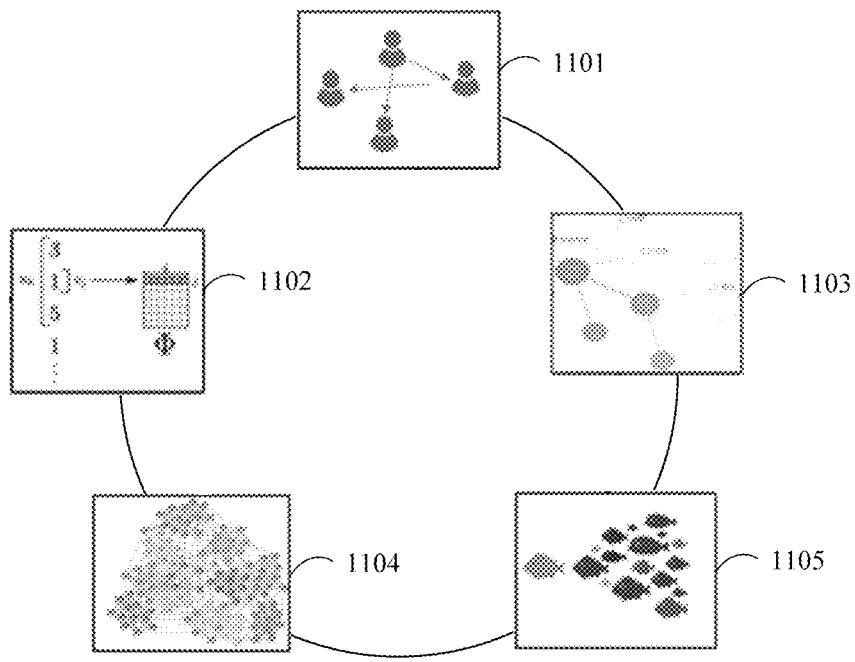
FIG. 11 is a schematic diagram representing association relationships between nodes in a fused relationship network according to an embodiment of the present disclosure.

FIG. 11 is a schematic diagram representing a plurality of association relationships between nodes in a fused relationship network according to an embodiment of the present disclosure.

As shown in FIG. 11, a plurality of representation forms of association relationships between nodes in the fused relationship network include an adjacency association relationship 1101, a vector association relationship 1102, an interaction domain relationship 1103, a community relationship 1104 and a recognition degree relationship 1105. In an example, a user recommendation may be made based on at least one of the plurality of association relationships described above. For example, a recommendation may be made to the users of nodes in a node group of a specific domain determined based on the interaction domain relationship 1103, and then a recommendation may be made to the users of the top 100 nodes with the highest recognition degree in a node group of a specific domain determined based on the recognition degree relationship 1105. Advertising or Feed recommendation may be made to the users of the top 100 nodes with the highest recognition degree belonging a specific domain, which can improve efficiency and accuracy of the information recommendation.

Figure 12:
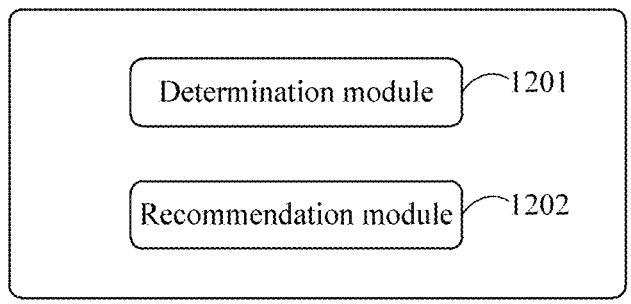
FIG. 12 is a block diagram of an apparatus of recommending information based on a fused relationship network according to an embodiment of the present disclosure.

FIG. 12 is a block diagram of an apparatus of recommending information based on a fused relationship network according to an embodiment of the present disclosure.

According to the embodiment of the present disclosure, the fused relationship network includes a plurality of nodes and a plurality of edges connecting the plurality of nodes. Each node represents a user, and each edge includes interaction information between users represented by two nodes connected with the edge, data source information of interaction information, and a weight which is determined based on the interaction information and the data source information for the edge.

As shown in FIG. 12, the apparatus 1200 of recommending information based on the fused relationship network may include a determination module 1201 and a recommendation module 1202.

The determination module 1201 is configured to determine association relationships between an any node and other nodes in the fused relationship network based on at least one of a weight, interaction information and data source information of the interaction information, of an edge.

The recommendation module 1202 is configured to recommend information to a user represented by the any node based on association relationships.

According to the embodiment of the present disclosure, the determination module 1201 includes a first determination unit, a first sorting unit and a second determination unit.

The first determination unit is configured to determine a plurality of neighbor nodes of the any node based on edges between nodes.

The first sorting unit is configured to sort the plurality of neighbor nodes according to a weight of an edge between the any node and each of the plurality of neighbor nodes.

The second determination unit is configured to determine adjacency relationships between the any node and the plurality of neighbor nodes according to a sorting order of the plurality of neighbor nodes.

According to the embodiment of the present disclosure, the determination module 1201 includes a first division unit, a third determination unit and a fourth determination unit.

The first division unit is configured to divide a plurality of nodes based on data source information of interaction information of edges between nodes, to generate a first node group for each data source.

The third determination unit is configured to determine association relationships between nodes in the first node group as the same data source relationship.

The fourth determination unit is configured to determine confidentiality level relationships among a plurality of first node groups based on an access permission level of each data source.

According to the embodiment of the present disclosure, the interaction information of an edge includes an interaction type and interaction contents, and the determination module 1201 includes a fifth determination unit, a coding unit, a generation unit, a second sorting unit and a sixth determination unit.

The fifth determination unit is configured to determine a plurality of neighbor nodes of the any node based on edges between nodes.

The encoding unit is configured to encode at least one of a weight, an interaction type, interaction contents, data source information, of an edge between nodes and the number of neighbor nodes to obtain a coding sequence for a node.

The generation unit is configured to generate a vector of the node based on the coding sequence for the node.

The second sorting unit is configured to sort each of other nodes based on a distance between the vector of the any node and the vector of each of the other nodes.

The sixth determination unit is configured to determine a vector association relationship between the any node and each of other nodes based on a sorting order of each of the other nodes.

According to an embodiment of the present disclosure, the determination module 1201 includes a second division unit and a seventh determination unit.

The second division unit is configured to divide a plurality of nodes by using a community discovery algorithm based on a weight of an edge between nodes, to generate a plurality of second node groups.

The seventh determination unit is configured to determine association relationships between nodes in the second node group are the same community relationship.

According to the embodiment of the present disclosure, the interaction information of an edge includes interaction contents, and the determination module 1201 includes a third division unit, an extraction unit, a processing unit, a fourth division unit, and an eighth determination unit.

The third division unit is configured to divide interaction contents of interaction information of an edge between nodes to obtain a plurality of word segmentations.

The extraction unit is configured to extract at least one keyword from the plurality of word segmentations.

The processing unit is configured to process the at least one keyword by using a pre-trained classification model to obtain interaction domain information for the node.

The fourth division unit is configured to divide a plurality of nodes based on the interaction domain information for the node, to generate a plurality of third node groups.

The eighth determination unit is configured to determine association relationships between nodes in the third node group as the same interaction domain relationship.

According to the embodiment of the present disclosure, the determination module 1201 includes a ninth determination unit, a tenth determination unit, a third sorting unit and an eleventh determination unit.

The ninth determination unit is configured to determine a plurality of neighbor nodes of each node based on an edge between nodes.

The tenth determination unit is configured to determine a recognition degree for each node based on the number of the neighbor nodes whose weights of edges between nodes are larger than a preset value.

The third sorting unit is configured to sort a plurality of nodes based on the recognition degree for each node.

The eleventh determination unit is configured to determine recognition degree relationships between the plurality of nodes based on a sorting order of the plurality of nodes.

According to an embodiment of the present disclosure, a plurality of data sources include at least one of at least one application program, at least one address book and at least one website.

According to the embodiment of the disclosure, the disclosure further provides an electronic device and a readable storage medium.

Figure 13:
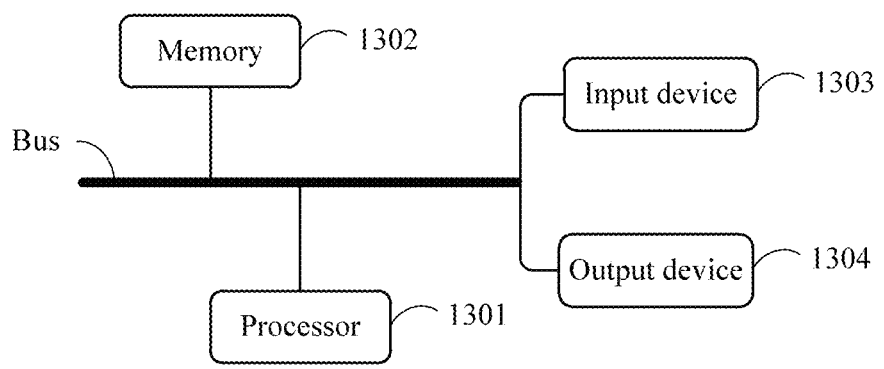
FIG. 13 is a block diagram of an electronic device for the method of recommending information based on a fused relationship network according to an embodiment of the present disclosure.

FIG. 13 is a block diagram of an electronic device for the method of recommending information based on a fused relationship network according to an embodiment of the disclosure. Electronic devices are intended to represent various forms of digital computers, such as laptop computers, desktop computers, workstations, personal digital assistants, servers, blade servers, mainframe computers, and other suitable computers. Electronic devices can also represent various forms of mobile devices, such as personal digital processors, cellular phones, smart phones, wearable devices, and other similar computing devices. The components as illustrated herein and connections, relationships, and functions thereof are merely examples, and are not intended to limit the implementation of the disclosure as described and/or required herein.

As shown in FIG. 13, the electronic device 1300 includes one or more processors 1301, a memory 1302, and interface(s) for connecting various components, including high-speed interface(s) and low-speed interface(s). The various components are connected to each other by using different buses, and can be installed on a common motherboard or installed in other manners as required. The processor may process instructions executed in the electronic device, including instructions stored in or on the memory to display graphical information of GUI (Graphical User Interface) on an external input/output device (such as a display device coupled to an interface). In other embodiments, multiple processors and/or multiple buses may be used with multiple memories if necessary. Similarly, multiple electronic devices can be connected in such a manner that each electronic device providing a part of necessary operations (for example, as a server array, a group of blade servers, or a multi-processor system). One processor 1301 is taken as an example in FIG. 13.

The memory 1302 is the non-transitory computer-readable storage medium provided by this disclosure. Wherein, the memory stores instructions executable by at least one processor, to cause the at least one processor executes the method of recommending information based on a fused relationship network provided by the disclosure. The non-transitory computer-readable storage medium of the disclosure stores computer instructions for causing a computer to execute the method of recommending information based on a fused relationship network provided by the disclosure.

As a non-transitory computer-readable storage medium, the memory 1302 can be used to store non-transitory software programs, non-transitory computer-executable programs, and modules, such as program instructions/modules (for example, the determination module 1201 and the recommendation module 1202 shown in FIG. 12) corresponding to the method of recommending information based on a fused relationship network in the embodiment of the disclosure. The processor 1301 performs various functional applications and data processing of the server by executing the non-transitory software programs, instructions, and modules stored in the memory 1302, thereby realizing the method of recommending information based on a fused relationship network in the embodiments of method described above.

The memory 1302 may include a program storage area and a data storage area. The program storage area may store an operating system and an application program required by at least one function; the storage data area may store data etc. generated by using the electronic device 1300 according to the method of recommending information based on a fused relationship network. In addition, the memory 1302 may include a high-speed random access memory, and may also include a non-transitory memory, such as at least one magnetic disk storage device, a flash memory device, or other non-transitory solid-state storage devices. In some embodiments, the memory 1302 may optionally include a memory located remotely to the processor 1301, and such remote memory may be connected to the electronic device 1300 for the method of recommending information based on a fused relationship network through a network. Examples of the network described above include, but are not limited to, Internet, intranet, local area network, mobile communication network, and combination thereof.

The electronic device 1300 for the method of recommending information based on a fused relationship network may further include: an input device 1303 and an output device 1304. The processor 1301, the memory 1302, the input device 1303, and the output device 1304 may be connected by a bus or in other manners. In FIG. 13, the connection by a bus is taken as an example.

The input device 1303 can receive input information of numbers or characters, and generate key input signals related to user settings and function control of the electronic device 1300 for the method of recommending information based on a fused relationship network, such as touch screen, keypad, mouse, trackpad, touchpad, indicator stick, one or more mouse buttons, trackball, joystick and other input devices. The output device 1304 may include a display device, an auxiliary lighting device (for example, LED), a tactile feedback device (for example, a vibration motor), and the like. The display device may include, but is not limited to, a liquid crystal display (LCD), a light emitting diode (LED) display, and a plasma display. In some embodiments, the display device may be a touch screen.

Various embodiments of the systems and technologies described herein can be implemented in digital electronic circuit systems, integrated circuit systems, application-specific ASICs (application-specific integrated circuits), computer hardware, firmware, software, and/or combinations thereof. These embodiments may be implemented in one or more computer programs executed and/or interpreted on a programmable system including at least one programmable processor. The programmable processor can be a dedicated or general-purpose programmable processor, which can receive data and instructions from a storage system, at least one input device, and at least one output device, and transmit the data and instructions to the storage system, the at least one input device, and the at least one output device.

These computer programs (also referred as programs, software, software applications, or codes) include machine instructions for programmable processors, and can utilize high-level programming languages, object-oriented programming languages, and/or assembly/machine language to implement these calculation procedures. As used herein, the terms "machine-readable medium" and "computer-readable medium" refer to any computer program product, device, and/or apparatus (e.g., magnetic disks, optical disks, memory, programmable logic devices (PLD)) for providing machine instructions and/or data to a programmable processor, including machine-readable media for receiving machine instructions as machine-readable signals. The term "machine-readable signal" refers to any signal for providing machine instructions and/or data to a programmable processor.

In order to implement interaction with the user, the systems and technologies described herein can be implemented on a computer including a display device (for example, CRT (Cathode Ray Tube) or LCD (Liquid Crystal Display) display) for displaying information to the user; and a keyboard and a pointing device (for example, a mouse or trackball) through which the user can provide input to the computer. Other types of devices can also be used to implement interaction with the user. For example, the feedback provided to the user can be any form of sensory feedback (e.g., visual feedback, auditory feedback, or tactile feedback), and input received from the user can be any form (including acoustic input, voice input, or tactile input).

The systems and technologies described here can be implemented in a computing system including back-end components (for example, as a data server), or a computing system including middleware components (for example, an application server), or a computing system including front-end components (for example, a user computer having a graphical user interface or a web browser through which the user can interact with the embodiments of the systems and technologies described herein), or a computing system including any combination of such background components, intermediate components, or front-end components. The components of the system can be connected to each other by digital data communication (for example, communication network) in any form or through any medium. Examples of communication networks include: LAN (Local Area Network), WAN (Wide Area Network), and Internet.

A computer system can include a client and a server. The client and server are generally far away from each other and usually interact through a communication network. The relationship between the client and the server is generated through computer programs running on the corresponding computers and having a client-server relationship with each other.

According to the technical solution of the embodiment of the present disclosure, association relationships between an any node and other nodes in the fused relationship network are determined based on at least one of a weight, interaction information and data source information of the interaction information, of an edge in the fused relationship network, and information is recommended to the user of the any node based on the association relationships. Compared with the traditional relationship network based on a single data source, the fused relationship network has a wide coverage of data sources and a full amount of user relationship information, which can mine a plurality of association relationships between users. Compared with the traditional user recommendation according to user information mined based on the user's operation data, the information recommendation made to the users having association relationships based on the association relationships between users has better pertinence to user groups, and can improve the efficiency and accuracy of user recommendation.

It should be understood that steps of the processes illustrated above can reordered, added or deleted in various manners. For example, the steps described in the disclosure can be performed in parallel, sequentially, or in different orders, as long as a desired result of the technical solution of the disclosure can be achieved, this is not limited herein.

The above embodiments do not constitute a limitation on the scope of protection of the disclosure. Those skilled in the art should understand that various modifications, combinations, sub-combinations, and substitutions can be made according to design requirements and other factors. Any modifications, equivalent replacements and improvements made within the spirit and principles of the disclosure shall be included in the scope of the disclosure.

What is claimed is:

1. A method of recommending information based on a fused relationship network, wherein the fused relationship network comprises a plurality of nodes and a plurality of edges connecting the plurality of nodes, wherein each node represents a user, and each edge comprises interaction information between users represented by two nodes connected with the edge, data source information of the interaction information, and a weight determined for the edge based on the interaction information and the data source information, the method comprising:
   determining association relationships between an any node and other nodes in the fused relationship network based on at least one of the weight, the interaction information and the data source information of the interaction information of the edge; and
   recommending information to a user represented by the any node based on the association relationships, wherein
   the interaction information of the edge comprises an interaction type and interaction contents; and
   determining association relationships between an any node and other nodes in the fused relationship network based on at least one of the weight, the interaction information and the data source information of the interaction information of the edge comprises:
   determining a plurality of neighbor nodes of the any node based on the edge between nodes;
   encoding at least one of the weight, the interaction type, the interaction contents, and the data source information of the edge between nodes and the number of the neighbor nodes to obtain a coding sequence for the node;
   generating a vector of the node based on the coding sequence for the node;
   sorting each of the other nodes based on a distance between the vector of the any node and the vector of each of the other nodes; and
   determining a vector association relationship between the any node and each of the other nodes based on a sorting order of each of the other nodes.

2. The method of claim 1, wherein the determining association relationships between an any node and other nodes in the fused relationship network based on at least one of the weight, the interaction information and the data source information of the interaction information of the edge further comprises:
   determining a plurality of neighbor nodes of the any node based on edges between nodes;
   sorting the plurality of neighbor nodes according to the weight of the edge between the any node and each of the plurality of neighbor nodes; and
   determining adjacency relationships between the any node and the plurality of neighbor nodes according to a sorting order of the plurality of neighbor nodes.

3. The method of claim 1, wherein the determining association relationships between an any node and other nodes in the fused relationship network based on at least one of the weight, the interaction information and the data source information of the interaction information of the edge further comprises:
  dividing the plurality of nodes based on the data source information of the interaction information of the edge between nodes, so as to generate a first node group for each data source; and
  determining the association relationships between nodes in the first node group as a same data source relationship.

4. The method of claim 3, further comprising:
  determining confidentiality level relationships among a plurality of first node groups based on an access permission level of each data source.

5. The method of claim 1, wherein the determining association relationships between an any node and other nodes in the fused relationship network based on at least one of the weight, the interaction information and the data source information of the interaction information of the edge further comprises:
  dividing the plurality of nodes by using a community discovery algorithm, based on the weight of the edge between nodes, to generate a plurality of second node groups; and
  determining the association relationships between nodes in the second node group are the same community relationship.

6. The method of claim 1, wherein the interaction information of the edge comprises interaction contents; and determining association relationships between an any node and other nodes in the fused relationship network based on at least one of the weight, the interaction information and the data source information of the interaction information of the edge further comprises:
  dividing the interaction contents of the interaction information of the edge between nodes to obtain a plurality of word segmentations;
  extracting at least one keyword from the plurality of word segmentations;
  processing the at least one keyword by using a pre-trained classification model to obtain interaction domain information for the node;
  dividing the plurality of nodes based on the interaction domain information for the node to generate a plurality of third node groups; and
  determining the association relationships between nodes in the third node group as the same interaction domain relationship.

7. The method of claim 1, wherein the determining association relationships between an any node and other nodes in the fused relationship network based on at least one of the weight, the interaction information and the data source information of the interaction information of the edge further comprises:
  determining a plurality of neighbor nodes of each node based on the edge between nodes;
  determining a recognition degree for each node based on the number of neighbor nodes whose weights of edges between nodes are larger than a preset value;
  sorting the plurality of nodes based on the recognition degree for each node; and
  determining recognition degree relationships between the plurality of nodes based on a sorting order of the plurality of nodes.

8. The method of claim 1, wherein the data source comprises at least one of at least one application, at least one address book and at least one website.

9. An electronic device, comprising:
  at least one processor; and
  a memory connected in communication with the at least one processor; wherein,
  the memory stores instructions executable by the at least one processor, and the instructions, when executed by the at least one processor, cause the at least one processor to perform operations of recommending information based on a fused relationship network, wherein the fused relationship network comprises a plurality of nodes and a plurality of edges connecting the plurality of nodes, wherein each node represents a user, and each edge comprises interaction information between users represented by two nodes connected with the edge, data source information of the interaction information, and a weight determined for the edge based on the interaction information and the data source information, the operations comprising:
  determining association relationships between an any node and other nodes in the fused relationship network based on at least one of the weight, the interaction information and the data source information of the interaction information of the edge; and
  recommending information to a user represented by the any node based on the association relationships, wherein
  the interaction information of the edge comprises an interaction type and interaction contents; and
  the at least one processor is further configured to:
    determine a plurality of neighbor nodes of the any node based on the edge between nodes;
    encode at least one of the weight, the interaction type, the interaction contents, and the data source information of the edge between nodes and the number of the neighbor nodes to obtain a coding sequence for the node;
    generate a vector of the node based on the coding sequence for the node;
    sort each of the other nodes based on a distance between the vector of the any node and the vector of each of the other nodes; and
    determine a vector association relationship between the any node and each of the other nodes based on a sorting order of each of the other nodes.

10. A non-transitory computer-readable storage medium storing computer instructions, wherein the computer instructions cause the computer to perform operations of recommending information based on a fused relationship network, wherein the fused relationship network comprises a plurality of nodes and a plurality of edges connecting the plurality of nodes, wherein each node represents a user, and each edge comprises interaction information between users represented by two nodes connected with the edge, data source information of the interaction information, and a weight determined for the edge based on the interaction information and the data source information, the operations comprising:
  determining association relationships between an any node and other nodes in the fused relationship network based on at least one of the weight, the interaction information and the data source information of the interaction information of the edge; and
  recommending information to a user represented by the any node based on the association relationships, wherein
  the interaction information of the edge comprises an interaction type and interaction contents; and
  the computer instructions further cause the computer to:

determine a plurality of neighbor nodes of the any node based on the edge between nodes;

encode at least one of the weight, the interaction type, the interaction contents, and the data source information of the edge between nodes and the number of the neighbor nodes to obtain a coding sequence for the node;

generate a vector of the node based on the coding sequence for the node;

sort each of the other nodes based on a distance between the vector of the any node and the vector of each of the other nodes; and determine a vector association relationship between the any node and each of the other nodes based on a sorting order of each of the other nodes.

* * * * *